United States Patent [19]
Prasad

[11] Patent Number: 5,205,842
[45] Date of Patent: Apr. 27, 1993

[54] TWO STAGE MEMBRANE DRYER

[75] Inventor: Ravi Prasad, East Amherst, N.Y.

[73] Assignee: Praxair Technology, Inc., Danbury, Conn.

[21] Appl. No.: 834,787

[22] Filed: Feb. 13, 1992

[51] Int. Cl.$^5$ .............................................. B01D 53/22
[52] U.S. Cl. ........................................... 55/16; 55/68; 55/158
[58] Field of Search ................................ 55/16, 68, 158

[56]  References Cited

U.S. PATENT DOCUMENTS

| | | | |
|---|---|---|---|
| Re. 33,502 | 12/1990 | Gollan | 55/16 |
| 3,339,341 | 9/1967 | Maxwell et al. | 55/16 |
| 3,735,558 | 5/1973 | Skarstrom et al. | 55/16 |
| 4,180,388 | 12/1979 | Graham et al. | 55/16 |
| 4,497,640 | 2/1985 | Fournié et al. | 55/16 |
| 4,631,129 | 12/1986 | Coplan et al. | 210/321.5 |
| 4,718,921 | 1/1988 | Makino et al. | 55/16 |
| 4,783,201 | 11/1988 | Rice et al. | 55/16 |
| 4,834,779 | 5/1989 | Paganessi et al. | 55/16 |
| 4,857,081 | 8/1989 | Taylor | 55/16 |
| 4,881,955 | 11/1989 | Bikson et al. | 55/16 |
| 4,931,070 | 6/1990 | Prasad | 55/16 |
| 4,934,148 | 6/1990 | Prasad et al. | 55/16 X |
| 4,961,759 | 10/1990 | Taylor | 55/16 |
| 4,981,498 | 1/1991 | Bikkson et al. | 55/16 |
| 5,004,482 | 4/1991 | Haas et al. | 55/16 |
| 5,034,025 | 7/1991 | Overmann, III | 55/16 |
| 5,067,971 | 11/1991 | Bikson et al. | 55/16 |
| 5,084,073 | 1/1992 | Prasad | 55/16 |
| 5,108,464 | 4/1992 | Friesen et al. | 55/16 |

FOREIGN PATENT DOCUMENTS

| | | |
|---|---|---|
| 0226431 | 12/1986 | European Pat. Off. |
| 0430304 | 6/1991 | European Pat. Off. ........ 55/16 |
| 54-061096 | 5/1979 | Japan .............................. 55/16 |
| 60-238119 | 11/1985 | Japan ............................ 55/158 |
| 60-238120 | 11/1985 | Japan ............................ 55/158 |
| 62-042723 | 2/1987 | Japan .............................. 55/16 |
| 62-193626 | 8/1987 | Japan .............................. 55/16 |
| 62-298423 | 12/1987 | Japan ............................ 55/158 |
| 63-111923 | 5/1988 | Japan ............................ 55/158 |
| 1-224028 | 9/1989 | Japan .............................. 55/16 |
| 2-135118 | 5/1990 | Japan .............................. 55/16 |

OTHER PUBLICATIONS

"Cactus Air Dryer", Permea Inc. 1998.
*Technology*, "Membrane-Based Compressed Air Dryer", Joseph Higgin, Jul. 1988, p. 35.

*Primary Examiner*—Robert Spitzer
*Attorney, Agent, or Firm*—Chung K. Pak

[57] ABSTRACT

This invention uses a first or roughing stage to remove the bulk of moisture and a second or polishing stage to complete the drying. The first stage can use a relatively small membrane area and a relatively low quality purge gas whereas the second stage can use a large membrane area and high quality purge gas, such as some product back purge. The arrangement provides efficient usage of available high quality purge gas, such as product, while minimizing product contamination. This two stage purging arrangement is especially attractive for those processes or systems where multigrade purge gases are available.

15 Claims, 2 Drawing Sheets

TWO STAGE MEMBRANE DRYER

FIELD OF THE INVENTION

The invention in general relates to the drying of gases. More particularly, it relates to a two stage membrane process and system for the enhanced drying of nitrogen, air and other gases.

BACKGROUND OF THE INVENTION

Water and/or other condensible gases, such as $CO_2$, are common impurities in many raw or process gases. These impurities are known to cause, among other things, unwanted reaction and corrosion in various systems which employ gases. To inhibit these detrimental effects, gases are usually pretreated to remove the impurities. Some of the conventional techniques used to remove the impurities, herein referred to as "wet components", include compression, cooling, adsorption and membrane separation. Among these conventional techniques, the membrane separation may be most attractive for economically dehydrating or drying wet gas streams, particularly in small scale operations.

The membrane separation generally involves the selective permeation of the wet components in a feed gas stream through utilizing a membrane module or cartridge. The membrane module or cartridge typically comprises membrane materials in the form of a plurality of small hollow fibers, which are disposed within an enclosure. The hollow membrane fibers, which may be constructed with synthetic Polymers or inorganic materials, are usually arranged to provide a large membrane surface area with particular flow configurations so that the wet components of a feed gas can selectively permeate therethrough in an efficient manner. The wet components of a feed gas, of course, can be selectively permeated from or to either side of the large membrane surface, i.e., from the outside, or shell side, of the hollow fibers to the fiber bores or from the fiber bores to the outside, or shell side, of the hollow fibers, as long as a pressure difference is maintained across the membrane. The wet components in a feed gas at the permeation pressure, for instance, permeates through the membrane to reach the lower pressure, permeate side thereof. The partial pressure difference that drives permeation will, however, be significantly reduced unless the wet components permeated to the low pressure, permeate side of the membrane are removed to maintain a low partial pressure of the components on the permeate side. Once the saturation point of the permeate is reached, then other undesirable effects such as capillary condensation could occur which could further reduce the permeation flow of the wet components.

It has been known to utilize a gas which is being dried to reduce the wet components vapor pressure on the permeate side of a membrane to below the saturation point. The membrane module sold under the tradename "Prism Cactus" by Permea Inc., Malvern, Industrial Park, Box 396, Malvern, Pa. 19355, for example, is designed to permeate a particular amount of the gas being dried together with the wet components. The permeating gas, in turn, carries an adequate amount of the wet components away from the low pressure, permeate side of the membrane so that the wet components vapor pressure on that side can be maintained below the saturation point. This permeation technique, however, is found to be inefficient not only because a higher pressure difference is needed to permeate a gas which is less permeable than the wet components, but also because the amount of the gas permeated for carrying out this purpose is substantial and represents loss of product.

In order to minimize these inefficiencies, the use of at least a portion of the dry product resulting from the membrane drying or a sufficiently dry gas from an external source to sweep or purge the wet components on the low pressure, permeate side of a membrane has been proposed. U.S. Pat. No. 4,931,070—Prasad and U.S. patent application Ser. No. 07/596,098, now U.S. Pat. No. 5,084,073—Prasad, for example, disclose a membrane module having at least four ports, one of which being used to introduce a recycling portion of the dry product gas or a gas from an external source to the low pressure, permeate side of a membrane to flush the wet components which are permeating through the membrane. As a result of using the dry product gas or an external source gas as purging means, the amount of the desired product gas lost to the permeate side of a membrane is decreased. Moreover, there is no need for a high pressure difference across the membrane since no gas need be permeated through the membrane with the wet components. In spite of these improvements, however, there remain certain limitations. For example, a large amount of the product gas must still be lost as a purge waste stream when the product gas is used to purge the wet components. If a sufficiently dry external source gas is substituted for the product gas as a purging means, the product gas can become contaminated due to back permeation of some of the external source purge gas across the drying membrane. It is, therefore, desirable in the art to develop improved membrane drying processes and systems to reduce the amount of the product gas lost to the permeate side of the membrane as well as the contamination level in the product gas.

It is an advantage of the present invention in providing an improved permeation drying process and system wherein the amount of dry product gas required for purging is reduced.

It is an additional advantage of the present invention in reducing the level of contamination due to back permeation when a foreign dry gas is employed as the purge means.

It is a further advantage of the present invention in providing an efficient and economical permeation process and system for removing water vapor from high purity nitrogen, which has been treated in a "Deoxo" process to remove traces of oxygen, with negligible recontamination of the product nitrogen during the drying process.

SUMMARY OF THE INVENTION

According to the present invention, the above and other advantages which will become apparent to those skilled in the art are attained by:

A process for drying wet gas streams in a particular membrane system comprising:

(a) passing a feed gas stream containing wet components under pressure to at least one first stage membrane having about 6% to about 80% of the total membrane surface area in the system;

(b) passing a gas stream from an external source to at least one low pressure, permeate side of said at least one first stage membrane to carry the permeated wet components away from the surface thereof;

(c) passing partially dried gas stream resulting therefrom under pressure to at least one second stage membrane having about 20% to about 94% of the total membrane surface area in the system;

(d) passing at least a portion of the resulting dried product gas from said second stage membrane to at least one low pressure, permeate side of said at least one second stage membrane to carry the permeated wet components away from the surface thereof, wherein said portion of the dried product gas employed is such that a cleaning ratio of less than about four is maintained; and (e) recovering the remaining dried product gas.

As used herein, the term "the total membrane surface area" means a membrane area which is necessary to efficiently permeate a given amount of wet components. This membrane area may vary depending on the thickness of a membrane, the type of membrane material used, the volume of a gas to be treated and the amount of wet components to be permeated.

As used herein, the term "a gas from an external source" is any suitable gas, other than the desired dry product gas or like, which is capable of carrying wet components away from the low pressure, permeate side of a membrane.

As used herein, the term "a cleaning ratio" means a purge ratio multiplied by a pressure ratio.

As used herein, the term "purge ratio" means a ratio of the amount of purge gas/the amount of gas to be recovered as dry gas.

As used herein the term "pressure ratio" means a feed pressure divided by a permeate pressure.

DETAILED DESCRIPTION OF THE INVENTION

The invention relates to improved membrane drying processes and systems, wherein significant amounts of dry product gases having low contamination levels are produced. These dry product gases are suitable for use in various applications due to their low contamination levels. These desired product gases are found to be formed in a significant amount in a particular membrane drying arrangement. The arrangement involves at least two membrane dryers, one for removing the bulk of the wet components in a gas stream and the other for completely drying the resulting partially dry gas stream. The bulk of the wet components is found to be removed in the initial stage even when a relatively small membrane area is used for drying. This discovery has lead to the use of an external source gas for purging the permeated wet components in the initial stage since the level of contamination by back diffusion of this foreign purge gas in a small membrane area is limited. By removing the bulk of the wet components in a gas stream using an external purge gas, the amount of the dry product gas required for purging in a subsequent membrane drying stage is significantly reduced. The subsequent stage may utilize a relatively large membrane area to maximize the drying since no contamination of the product gas occurs when the same quality gas is used in purging. This arrangement, therefore, provides efficient usage of available high quality product gases as purging means while minimizing the contamination of the product gases. It may be especially attractive for those processes or systems where multigrade purge gases are available.

Figure 1:
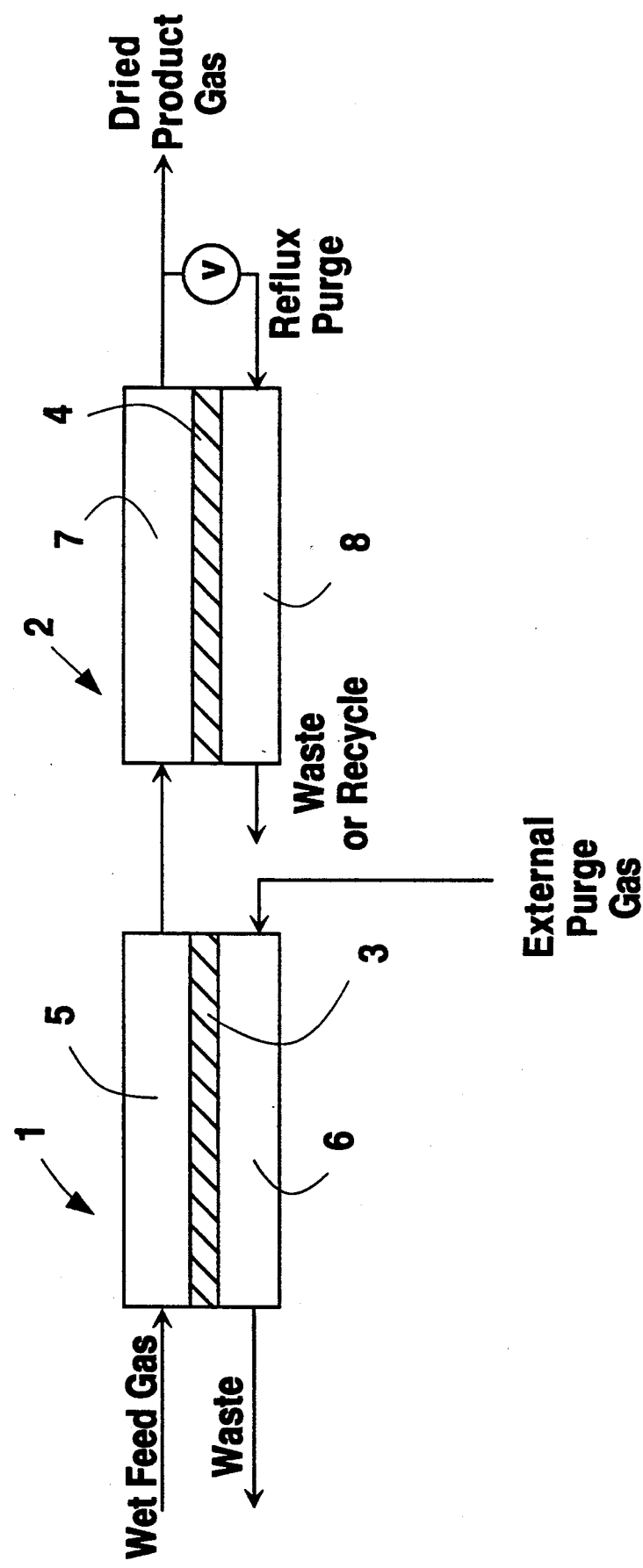
FIG. 1 is a schematic flow diagram of a membrane system, which represents one embodiment of the invention.

A preferred two stage membrane system for drying gases is described with reference to FIG. 1. However, as can readily be appreciated, the description of a preferred embodiment in no way precludes numerous variations of the membrane gas drying system which will become readily apparent to those skilled in the art. In FIG. 1, there is illustrated a two stage membrane system having two permeators or membrane modules (1 and 2) in series. Each module may comprise membrane materials (3 or 4) in the form of hollow fibers. Any membrane material may be used to construct the hollow fibers as long as it is capable of selectively permeating the wet components. Composite or asymmetric hollow-fiber membranes, however, are usually preferred due to their permeation or separation characteristics. Composite membranes generally comprise a thin separation layer or coating of a suitable permeable membrane material superimposed on a porous substrate. The thin separation layer determines the separation characteristics of the composite structure, with the porous substrate providing physical support for the separation layer. Asymmetric membranes, on the other hand, are composed of a single permeable membrane material having a thin, dense semipermeable skin region that determines the separation characteristics of the membrane, and a less dense, porous, generally non-selective support region that serves, as does the porous substrate of composites, to preclude the failure of the thin skin region under pressure. Both types of the membranes may have a particular substrate morphology to achieve a significant degree of radial mixing as described in U.S. patent application Ser. No. 07/596,098, now U.S. Pat. No. 5,084,073, herein incorporated by reference, and can be prepared using any known materials and methods including those described in U.S. patent application Ser. No. 07/596,098 now U.S. Pat. Nos. 5,084,073, 4,981,498 and 4,881,955, herein incorporated by reference. The composite or asymmetric metric membrane herein is characterized by having a separating factor for $H_2O$/gas to be dried of at least about 50, preferably greater than about 500, more preferably greater than about 1000.

The hollow fiber membranes may also be arranged to achieve a uniform flow of feed gas and to permeate gas across the surfaces of the membranes. Preferably, the hollow fiber membranes are arranged in a helically wound hollow fiber membrane cartridge containing hollow fibers of essentially uniform active lengths. Such helical winding is known in the art as evidenced by the disclosure of the Coplan et al patent, U.S. Pat. No. 4,631,128. Those skilled in the art will appreciate that the desired uniform flow distribution of gas across the surface of the hollow fibers cannot be achieved simply by arranging the hollow fibers in the membrane cartridge with a parallel or straight configuration rather than the particular helical winding configuration referred to above. It will be appreciated, however, that other, less economically desirable means may be employed to achieve said uniform flow of gas. Thus, it is possible to provide screens or other flow restriction means, such as baffles, which can be arranged to achieve said uniform flow path. The hollow fibers can also be arranged in a braided form similar to rope, with the structured pattern thereof enabling the desired uniform gas flow to be achieved.

Furthermore, the resulting hollow fiber bundle may be also encased with impervious barrier materials in a particular manner to provide countercurrent flow patterns across the permeate and non-permeate surfaces (5, 6, 7 and 8) of the membrane. European Patent Publication No. 0226431, published June 24, 1987, herein incorporated by reference, discloses such countercurrent flow pattern creation, which enables the feed gas or permeate gas, depending on the desired manner of operation to pass in countercurrent flow outside the hollow fibers parallel to the flow direction of permeate gas or feed gas in the bores of the hollow fibers. For example, feed gas on the outside of the hollow fiber bundle is caused to flow parallel to, rather than at right angle to, the central axis of the fiber bundle. The impermeable barrier materials may be a wrap of impervious film, e.g., polyvinylidene or the like. Alternatively, the impermeable barrier materials may be an impervious coating material, e.g., polysiloxane, applied from an innocuous solvent, or a shrink sleeve installed over the membrane bundle and shrunk onto the bundle. An O-ring or other means such as structured packing may also be used between the hollow fiber bundle and the shell of the membrane module, or the shell itself may be positioned in close proximity to the membrane bundle so as to form the desired barrier. The impermeable barrier, in such embodiments, thus encases the hollow fiber bundle, other than for an opening therein permitting the flow of gas into or away from the bundle, so that the fluid flows along the outer surface of essentially all of the hollow fibers in the bundle in a direction substantially parallel to the axis of the hollow fiber bundle. The resulting flow pattern is one of countercurrent flow of the wet feed stream and the permeate gas which comprises purge gas together with the wet components that permeates through the membrane material. If necessary, however, the countercurrent flow patterns can be changed to provide cocurrent flow patterns by feeding feed gas and purge gas from particular locations.

Each membrane module (1 or 2) having hollow membrane fibers (3 and 4) may be designed with at least four gas ports, i.e., an inlet feed gas port, an outlet non-permeate product gas port, an input port for purge gas and an outlet port for the combined purge gas and the permeate gas (waste gas). While both the inlet feed gas port and the outlet non-permeate product gas port are in communication with the high pressure, non-permeate side (5 or 7) of the membrane (3 or 4) both the inlet port for the purge gas and the outlet port for the waste gas are in communication with the low pressure, permeate side (6 or 8) of the membrane (3 or 4). The high pressure, non-permeate side (5 or 7) of the membrane can be either the bore side or the outer shell side of the hollow fiber, with the opposite side, i.e. the bore side or the outer shell side of the hollow fibers, representing the low pressure, permeate side (6 or 8) of the membrane.

In the separation process, a feed gas stream containing wet components initially is provided at high pressure (wet component permeation pressure) to the high pressure, non-permeate side (5) of the membrane (3) in the module (1). The feed gas employed is preferably wet nitrogen from a conventional "deoxo" process which is known to be useful in removing traces of oxygen from nitrogen in the form of $H_2O$. Such wet nitrogen from the conventional "Deoxo" process, for example, is described in U.S. Pat. No. 4,931,070. It should be noted, however, that other wet gases, such as wet air, can also be employed as the feed gas.

As this feed gas passes over the high pressure, non-permeated side (5) of the membrane (3), the wet components therein permeate through the membrane to the low pressure, permeate side (6) of the membrane (3). An external source purge gas or foreign purge gas is sent to the low pressure, permeate side (6) of the membrane (3) to carry the permeated wet components away from the permeate side thereof in order to maintain a high driving force across the membrane for continuous wet component removal. The purge gas may flow countercurrently with respect to the feed gas along the length of the membrane to enhance or optimize the removal of the permeated wet components. The purge gas carrying the wet components may be removed from the module (1) under vacuum conditions. The membrane area available in the module (1) is such that the bulk of the wet components can be permeated through the membrane with negligible contamination to the non-permeate gas which is being dried. Such contamination would occur by back permeation of components of the purge gas into the high pressure side of the membrane. This membrane area represents about 6% to about 80%, preferably about 6% to about 45%, of the total membrane area in the system. Through utilizing this particular membrane area distribution, the contamination of the product gas by back diffusion or permeation of the external or foreign purge gas can be limited during the drying.

The resulting partially dry feed gas from the module (1) is sent to the high pressure, non-permeate side (7) of the membrane (4) in a module (2). As the partially dry feed gas under high pressure passes over the non-permeate side (7) of the membrane, the remaining wet components therein permeate through the membrane to the low pressure, permeate side (8) of the membrane. A portion of the completely or substantially dry gas resulting therefrom is sent to the lower pressure, permeated side of the membrane as a reflux purge to carry the wet components away from the lower pressure, permeate side thereof. The reflux gas may flow cocurrently or countercurrently with respect to the partially dry feed gas. The membrane area in this stage should be large enough to cause complete or substantial removal of the wet components in the partially dry gas stream. The membrane area should represent about 20% to about 94%, preferably about 55% to about 94%, of the total membrane area in the system. The resulting wet components containing purge stream, which may be withdrawn under vacuum conditions, need not be discarded as waste since it can be often recycled to a suitable point in the process to recover the product in it.

The following example serves to illustrate the invention. It is presented for illustrative purposes and is not intended to be limiting.

EXAMPLE

In a conventional "deoxo" process, a nitrogen stream containing about 1 to about 5% oxygen has been catalytically treated in the presence hydrogen to convert the oxygen thereof to water. The wet nitrogen stream to be dried was derived from this "deoxo" process. The wet nitrogen stream was fed at a rate of about 10,000 NCFH under a pressure of about 130 psig and a temperature of about 110° F. to the two stage membrane module systems shown in FIG. 1. The permeation membrane used in the modules had a separation factor for $O_2/N_2$ of about 6 and a separation factor for $H_2O/O_2$ of about 1000. A stream of nitrogen containing about 12.6% $O_2$ and about 42 ppm $H_2O$ was used as a purge gas at about 17 psia for the first stage while dry product purge is employed in the second stage. A particular purge ratio is maintained to obtain a product gas having less than 13 ppm wet components. Under these conditions, the total membrane area for efficiently drying the wet nitrogen feed gas was determined to be about 1524 sq. ft. This total membrane area was allocated to either the first stage, the second stage or both the first and second stages as shown in Table 1 below:

TABLE I

| Total Area 1524 sq ft | | | 2nd Stage | Input Moisture 8810 ppm | |
|---|---|---|---|---|---|
| % Area Stage 1 | % Area Stage 2 | Interstage H2O ppm | Purge Ratio % | O2 Backperm PPM | Total N2 Loss % |
| 100.00 | 0 | | | 218 | .22 |
| 87.01 | 12.99 | 25 | 7.0 | 190 | 7.22 |
| 73.75 | 26.25 | 50 | 10.9 | 161 | 11.12 |
| 66.54 | 33.46 | 75 | 12.5 | 145 | 12.67 |
| 59.65 | 40.35 | 100 | 13.0 | 130 | 13.22 |
| 44.55 | 55.45 | 250 | 15.0 | 97 | 15.22 |
| 33.73 | 66.27 | 500 | 16.0 | 73 | 16.22 |
| 23.56 | 76.44 | 1000 | 16.9 | 51 | 17.12 |
| 14.37 | 85.63 | 2000 | 17.6 | 31 | 17.82 |
| 9.65 | 90.35 | 3000 | 18.1 | 21 | 18.32 |
| 6.63 | 93.37 | 4000 | 18.4 | 14 | 18.62 |
| 0 | 100 | 3310 | 20.0 | 0 | 20.22 |

Figure 2:
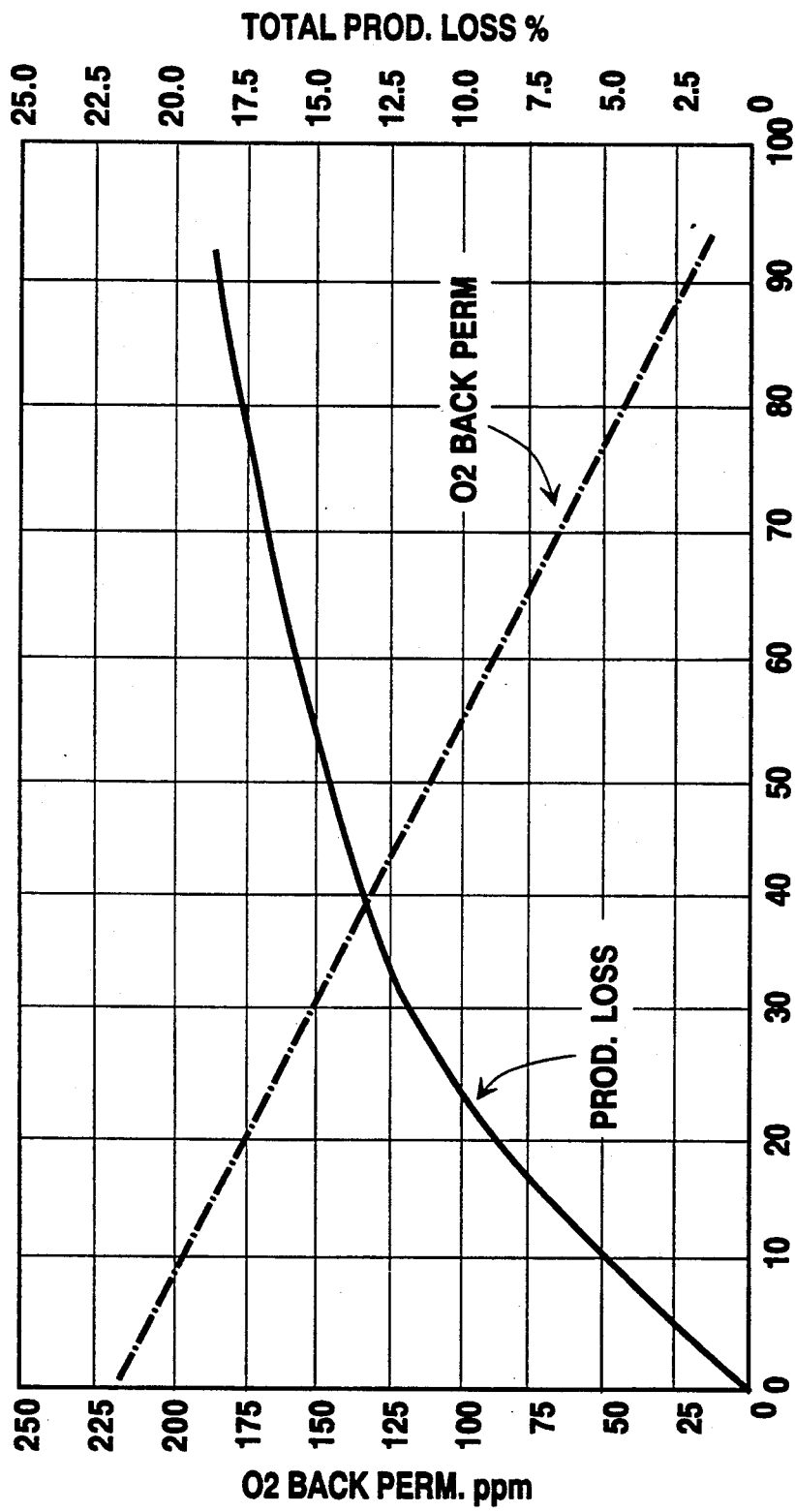
FIG. 2 is a graph illustrating the relationship between the percentage of the total membrane area allocated to the second stage membrane and the amount of $O_2$ back permeation and the $N_2$ product loss.

The $O_2$ back permeation and the total $N_2$ product loss are plotted in FIG. 2 against the percent of the total area in stage 2. The resulting graph and data in Table I show that, for given external dry purge gas and product purge gas, allocating the total membrane area to only one stage is inefficient. When, for example, an external source purge gas, i.e. a nitrogen stream containing about 12.6% $O_2$ and about 42 ppm $H_2O$, is used in conjunction with wet nitrogen gas in a single membrane module having a membrane area of about 1524 sq. ft., the nitrogen product contains 218 ppm of oxygen due to back permeation of the impure purge stream. Due to the high concentration of oxygen, this nitrogen product is less attractive in many applications. On the other hand, essentially oxygen free nitrogen product can be produced in a single stage having a membrane area of about 1524 sq.ft. when a portion of the nitrogen product is used as a purging means. This approach, however, reduces the amount of the recovered nitrogen by at least about 20%.

The above deficiencies associated with the single stage membrane drying are shown to be mitigated through using a two stage membrane drying system which utilizes a particular membrane area and a particular purging gas in a particular sequence. The amount of oxygen impurity can be reduced to less than 200 ppm, preferably below 100 ppm while the amount of the product loss can be reduced from about 2% to about 13%. These results are significant in commercial operations since a substantial amount of gas is subject to drying for a wide range of applications.

Although the invention has been described in detail with reference to certain specific embodiments, those skilled in the art will recognize that there are other embodiments within the spirit and scope of the claims.

What is claimed is:

1. A process for drying wet gas streams in a membrane system, said process comprising steps of:
    (a) passing a feed gas stream containing wet components under pressure to at least one first stage membrane having about 6% to about 80% of the total membrane surface area in the system;
    (b) passing a gas stream from an external source comprising a foreign gas to at least one low pressure, permeate side of said at least one first stage membrane to carry the permeated wet components away from the permeate side thereof;
    (c) passing the partially dried feed gas stream resulting therefrom under pressure to at least one second stage membrane having about 20% to about 94% of the total membrane surface area in the system;
    (d) passing at least a portion of the resulting dried product gas from said at least one second stage membrane to at least one low pressure, permeate side of said at least one second stage membrane to carry the permeated wet components away from the permeate side thereof, wherein step (d) is carried out at a cleaning ratio of less than about 4; and
    (e) recovering the remaining portion of the dry product gas.

2. The process according to claim 1, wherein said feed gas stream consists essentially of high purity wet nitrogen.

3. The process according to claim 1, wherein the permeated wet components carrying purge gas streams are withdrawn under vacuum conditions.

4. The process according to claim 1, wherein the permeation of the wet components takes place under a radially mixed condition.

5. The process according to claim 1, wherein said at least one first and/or at least one second stage membrane is composite membrane having a separating factor for $H_2O$/gas to be dried of at least about 50.

6. The process according to claim 1, wherein said at least one first and/or second stage membrane is asymmetric membrane having a separating factor for $H_2O$/gas to be dried of about at least about 50.

7. The process according to claim 1, wherein an essentially uniform flow of said feed gas stream is obtained across the membrane.

8. The process according to claim 1, wherein said at least one first stage membrane has a smaller membrane surface area than said at least one second stage membrane.

9. A process for drying high purity wet nitrogen gas streams in a membrane system, said process comprising:
    (a) passing a high purity nitrogen gas stream containing wet components under pressure to at least one first stage membrane having about 6% to about 80% of the total membrane surface area in the system,
    (b) passing a gas stream containing a foreign gas from an external source to at least one low pressure, permeate side of said at least one first stage membrane to carry the permeated wet components away from the permeate side thereof;
    (c) passing the partially dried high purity nitrogen gas stream resulting therefrom under pressure to at least one second stage membrane having about 20% to about 94% of the total membrane surface area in the system;
    (d) passing at least a portion of the resulting dried high purity nitrogen product gas from said at least one second stage membrane to at least one low pressure, permeate side of said at least one second stage membrane to carry the permeated wet components away from the permeate said thereof; and (e) recovering the remaining portion of the dried high purity nitrogen product gas.

10. A membrane capable of drying a wet gas stream, said system comprising: at least two membrane modules connected in series, each having at least four gas ports and at least one membrane having at least one non-permeate side and at least one permeate side, with a defined membrane area, the combined membrane area of said at least two membrane modules being based on the total membrane area in the system, wherein an earlier module is connected to an external purge gas source containing a foreign gas to provide purging means containing a foreign gas on the permeate side of said at least one membrane thereof and a later module is provided with a reflux purging means to direct a gas derived from the non-permeate side to the permeate side of said at least one membrane thereof and wherein the earlier module has a smaller membrane area than the later module.

11. The membrane system according to claim 10, wherein said at least one membrane in said earlier and/or later module is composite membrane having a separating factor for $H_2O$/gas to be dried of at least about 50.

12. The membrane system according to claim 10, wherein said at least one membrane in said earlier and/or later module is asymmetric membrane having a separating factor for $H_2O$/gas to be dried of at least about 50.

13. The membrane system according to claim 10, wherein said at least one membrane in said earlier and/or later module is encased with impermeable barrier materials.

14. The membrane system according to claim 10, further comprising means for creating vacuum conditions in communication with said later module.

15. The membrane system according to claim 10, further comprising means for creating vacuum conditions in communication with the earlier module.

* * * * *

UNITED STATES PATENT AND TRADEMARK OFFICE
CERTIFICATE OF CORRECTION

PATENT NO. : 5,205,842
DATED     : April 27, 1993
INVENTOR(S) : Ravi Prasad

It is certified that error appears in the above-identified patent and that said Letters Patent is hereby corrected as shown below:

In column 3, line 9, insert --system-- after "A membrane".

Signed and Sealed this

Seventh Day of December, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,205,842
DATED : April 27, 1993
INVENTOR(S) : Ravi Prasad

It is certified that error appears in the above-identified patent and that said Letters Patent is hereby corrected as shown below:

In column 9, line 3, insert --system-- after "A membrane".

This certificate supersedes certificate of correction issued December 7, 1993.

Signed and Sealed this

Eighth Day of November, 1994

Attest:

BRUCE LEHMAN

Attesting Officer    Commissioner of Patents and Trademarks